United States Patent
Yuan et al.

(10) Patent No.: US 9,588,805 B2
(45) Date of Patent: Mar. 7, 2017

(54) METHOD AND TERMINAL DEVICE FOR CONTROLLING BACKGROUND APPLICATION

(71) Applicant: Xiaomi Inc., Beijing (CN)

(72) Inventors: Jun Yuan, Beijing (CN); Minghao Li, Beijing (CN); Jinxiang Liang, Beijing (CN); Jiantao Tao, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 21 days.

(21) Appl. No.: 14/696,486

(22) Filed: Apr. 27, 2015

(65) Prior Publication Data

US 2016/0062792 A1 Mar. 3, 2016

Related U.S. Application Data

(63) Continuation of application No. PCT/CN2015/071367, filed on Jan. 22, 2015.

(30) Foreign Application Priority Data

Aug. 29, 2014 (CN) .......................... 2014 1 0436455

(51) Int. Cl.
G06F 9/46 (2006.01)
G06F 9/48 (2006.01)
G06F 9/50 (2006.01)

(52) U.S. Cl.
CPC ............ *G06F 9/485* (2013.01); *G06F 9/5022* (2013.01)

(58) Field of Classification Search
None
See application file for complete search history.

(56) References Cited

U.S. PATENT DOCUMENTS

| | | | |
|---|---|---|---|
| 2012/0102504 A1* | 4/2012 | Iyer | G06Q 10/00 719/318 |
| 2014/0223437 A1* | 8/2014 | Chang | G06F 9/4881 718/102 |
| 2015/0347262 A1* | 12/2015 | Vyas | G06F 11/3409 718/104 |

* cited by examiner

*Primary Examiner* — Kenneth Tang
(74) *Attorney, Agent, or Firm* — Jun He Law Offices P.C.; James J. Zhu

(57) ABSTRACT

The present disclosure provides a method which includes: generating an application list according to applications running in an operating system; traversing the identifiers in the application list; determining whether an application corresponding to a currently traversed identifier is a background application; determining whether a predetermined white list comprises the currently traversed identifier and whether the number of identifiers corresponding to background applications in the application list is greater than a predetermined threshold, if the application corresponding to the currently traversed identifier is a background application; selecting an identifier corresponding to a background application from the application list and closing the background application corresponding to the selected identifier, if the predetermined white list comprises the currently traversed identifier and the number is greater than the predetermined threshold; or closing the application corresponding to the currently traversed identifier if the predetermined white list does not comprise the currently traversed identifier and the number is greater than the predetermined threshold.

15 Claims, 6 Drawing Sheets

METHOD AND TERMINAL DEVICE FOR CONTROLLING BACKGROUND APPLICATION

CROSS-REFERENCE TO RELATED APPLICATION

This application is a Continuation application of International Application No. PCT/CN2015/071367, filed with the State Intellectual Property Office of P. R. China on Jan. 22, 2015, which is based upon and claims priority to Chinese Patent Application No. 201410436455.8, filed on Aug. 29, 2014, the entirety contents of which are incorporated herein by reference.

TECHNICAL FIELD

The present disclosure relates to a field of a terminal device, and more particularly, to a method and terminal device for controlling a background application.

BACKGROUND

As terminal devices develop to be more and more intelligent, there are more and more applications (APPs), and people can enjoy the convenience due to the intelligence of the terminal devices. When a user uses the terminal device, he/she may be used to keeping several frequently used applications in a background running state. The frequently used applications include twitter, WeChat, QQ, etc. An application in a background running state on the terminal device may be called as background application. If the number of background applications is small, the occupied memory resource of the terminal device is small. If the number of background applications is large, the occupied memory resource in the terminal device is large, such that the processing speed of the terminal device is affected. Thus, it is important to know how to control background applications in the terminal device.

In a related art, a method for controlling a background application is as follows. A maximum threshold is provided, and it is monitored by the terminal device whether the number of background applications is greater than the maximum threshold. If the number of background applications is less than or equal to the maximum threshold, each of the background applications is allowed to be in a background running state. If the number of background applications is greater than the maximum threshold, a background application occupying the biggest memory space may be closed. For example, assuming the maximum threshold is 25, if the number of background applications is 24, each of the background applications is allowed to be in the background running state. If the number of background applications is 26, the background application occupying the biggest memory space may be closed so as to release the memory space.

In the above described method, it is determined whether a background application is closed by determining whether the number of background applications is greater than the maximum threshold. If the number of background applications is greater than the maximum threshold, the background application occupying the biggest memory space may be closed. While the user may wish to keep the background application occupying the biggest memory space in a background running state all the time, the closing of the background application may affect the user experience. Thus, with the above described method, the background application in the terminal device cannot be well controlled, thereby affecting the user experience.

SUMMARY

The present disclosure provides a method and terminal device for controlling a background application.

According to a first aspect of embodiments of the present disclosure, there is provided a method for controlling a background application, including: generating an application list according to applications running in an operating system, wherein the application list comprises at least identifiers of the applications running in the operating system; traversing the identifiers in the application list; determining whether an application corresponding to a currently traversed identifier is a background application; determining whether a predetermined white list comprises the currently traversed identifier and whether the number of identifiers corresponding to background applications in the application list is greater than a predetermined threshold, if the application corresponding to the currently traversed identifier is a background application, in which the predetermined white list comprises identifiers of background applications assigned by a user; and selecting an identifier corresponding to a background application from the application list and closing the background application corresponding to the selected identifier, if the predetermined white list comprises the currently traversed identifier and the number is greater than the predetermined threshold; or closing the application corresponding to the currently traversed identifier if the predetermined white list does not comprise the currently traversed identifier and the number is greater than the predetermined threshold.

According to a second aspect of embodiments of the present disclosure, there is provided a terminal device for controlling a background application, including: a processor; a memory configured to store instructions executable by the processor; in which the processor is configured to perform: generating an application list according to applications running in an operating system, wherein the application list comprises at least identifiers of the running applications in the operating system; traverse the identifiers in the application list; determining whether an application corresponding to a currently traversed identifier is a background application; determining whether a predetermined white list comprises the currently traversed identifier and whether the number of identifiers corresponding to background applications in the application list is greater than a predetermined threshold, if the application corresponding to the currently traversed identifier is a background application, wherein the predetermined white list comprises identifiers of background applications assigned by a user; and selecting an identifier corresponding to a background application from the application list and close the background application corresponding to the selected identifier, if the predetermined white list comprises the currently traversed identifier and the number is greater than the predetermined threshold; or closing the application corresponding to the currently traversed identifier if the predetermined white list does not comprise the currently traversed identifier and the number is greater than the predetermined threshold.

The technical solution disclosed in the embodiments of the present disclosure can have advantages as follows. In order to determine by a terminal device whether a background application should be closed, it is required to take into account whether the number of background applications is greater than a predetermined threshold, as well as whether a predetermined white list comprises an identifier of the background application to be closed. The predetermined white list comprises identifiers of background applications assigned by a user. That is, the user does not want to close any of the background applications corresponding to the identifiers in the predetermined white list. For a currently traversed identifier, if the predetermined white list comprises the currently traversed identifier and the number of background applications is greater than the predetermined threshold, a background application is selected and closed. If the predetermined white list does not comprise the currently traversed identifier and the number of background applications is greater than the predetermined threshold, an application corresponding to the currently traversed identifier is closed. Since the background applications assigned by the user are not closed rashly, the background applications can be better controlled, compared to the method in the related art in which an application to be closed occupying a biggest memory space may be a background application assigned by the user, thus improving the user experience.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
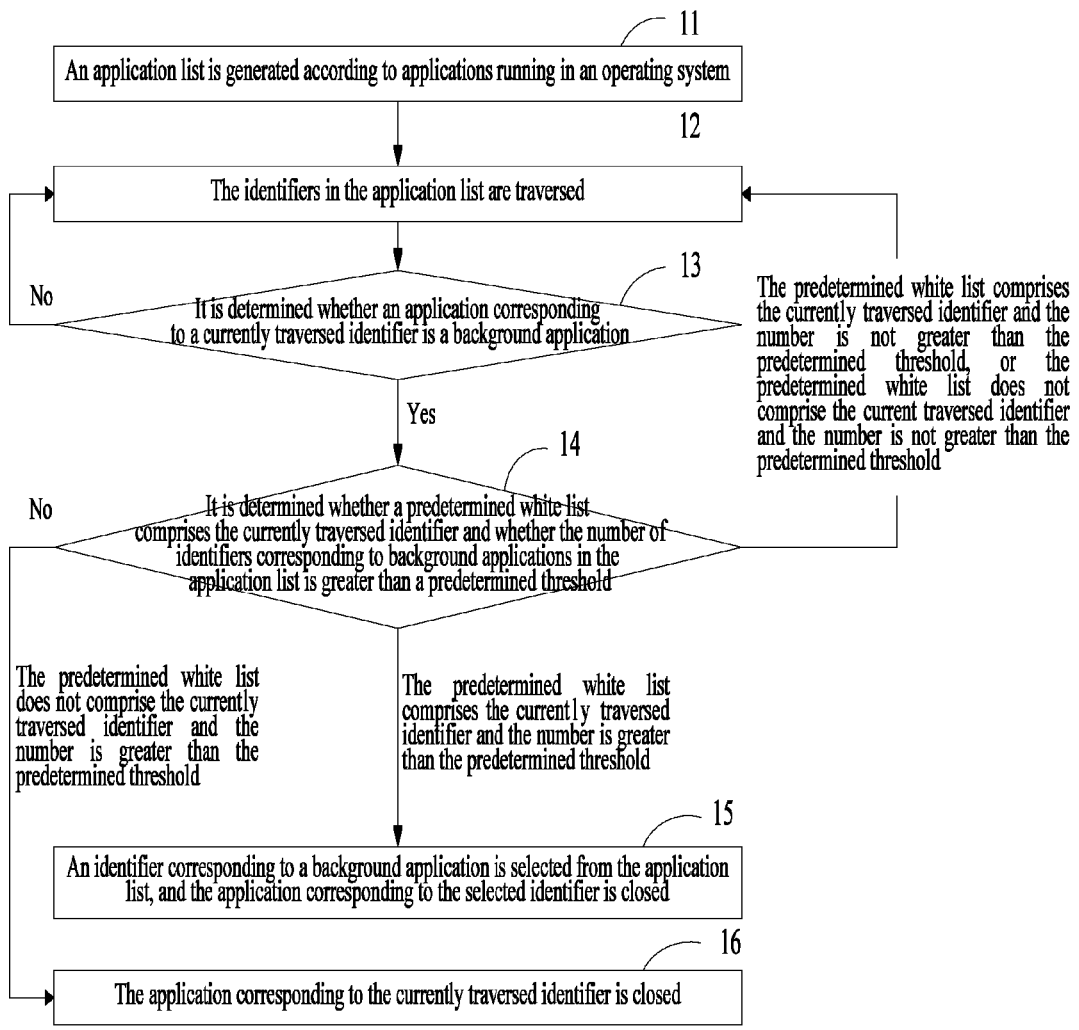
FIG. 1 is a flow chart illustrating a method for controlling a background application according to an exemplary embodiment of the present disclosure.

FIG. 1 is a flow chart illustrating a method for controlling a background application according to an exemplary embodiment of the present disclosure. As shown in FIG. 1, the method used in a terminal device includes the following steps.

In step 11, an application list is generated according to applications running in an operating system.

Generally, the operating system is installed on a terminal device. A frequently used operating system may be an Android system, a Windows system, an IOS system and so on. Many applications may be installed on the terminal device to meet various requirements of a user. The user may also set up required applications. These applications can only run in the operating system of the terminal device. Thus, in order to control the background applications, the application list is generated according to the applications running in the operating system. The application list comprises identifiers of the applications running in the operating system. An identifier of an application may be, but is not limited to, a name, an icon of the application and so on.

The application list may comprise information such as the identifiers, last activated time and the priority of running state of the applications running in the operating system. The application list comprises at least the identifiers of the applications running in the operating system.

In step 12, the identifiers in the application list are traversed.

In step 13, it is determined whether an application corresponding to a currently traversed identifier is a background application.

The identifiers in the application list may be traversed, and an identifier being traversed is defined as a currently traversed identifier. Since the present invention is related to controlling background applications, it is firstly determined whether the application corresponding to the currently traversed identifier is a background application.

If the application corresponding to the currently traversed identifier is a background application, in step 14, it is determined whether a predetermined white list comprises the currently traversed identifier and whether the number of identifiers corresponding to background applications in the application list is greater than a predetermined threshold.

If the application corresponding to the currently traversed identifier is not a background application, proceed with step 12.

The predetermined white list comprises identifiers of background applications assigned by the user, i.e. the identifiers of background applications that the user does not want to close. For example, a background application assigned by the user may be QQ, WeChat, fetion, Baidu map and so on. Accordingly, the predetermined white list may comprise identifiers of applications such as QQ, WeChat, fetion, Baidu map, etc.

The predetermined threshold may be provided according to a hardware configuration of the terminal device and practical requirements. For example, the predetermined threshold may be set to be 10, 20, or 25, etc.

If the predetermined white list comprises the currently traversed identifier and the number of identifiers corresponding to background applications in the application list is greater than the predetermined threshold, in step 15, an identifier corresponding to a background application is selected from the application list, and the application corresponding to the selected identifier is closed.

If the predetermined white list comprises the currently traversed identifier and the number of identifiers corresponding to the background applications in the application list is greater than the predetermined threshold, in order to ensure that the operating system runs normally and that the user experience is good, a background application may be selected and closed.

If the predetermined white list does not comprise the currently traversed identifier and the number of identifiers corresponding to background applications in the application list is greater than the predetermined threshold, in step 16, the application corresponding to the currently traversed identifier is closed.

If the predetermined white list does not comprise the currently traversed identifier and the number of identifiers corresponding to background applications in the application list is greater than the predetermined threshold, the application corresponding to the currently traversed identifier may be closed directly. Since the predetermined white list does not comprise the currently traversed identifier, that is, the application corresponding to the currently traversed identifier is not the background application assigned by the user, the application corresponding to the currently traversed identifier may be closed directly, such that memory resources may be saved, thus improving the user experience.

If the predetermined white list comprises the currently traversed identifier and the number of identifiers corresponding to background applications in the application list is not greater than the predetermined threshold, or the predetermined white list does not comprise the currently traversed identifier and the number of identifiers corresponding to background applications in the application list is not greater than the predetermined threshold, proceed with step 12.

With the method for controlling the background application according to embodiments of the present disclosure, in order to determine by the terminal device whether a background application should be closed, it is required to take into account whether the number of background applications is greater than the predetermined threshold, as well as whether the predetermined white list comprises the identifier of the background application to be closed. The white list comprises identifiers of background applications assigned by the user. That is, the user does not want to close any of the background applications corresponding to the identifiers in the predetermined white list. For the currently traversed identifier, if the predetermined white list comprises the currently traversed identifier and the number of background applications is greater than the predetermined threshold, a background application is selected and closed. If the predetermined white list does not comprise the currently traversed identifier and the number of background applications is greater than the predetermined threshold, the application corresponding to the currently traversed identifier is closed. Since a background application assigned by the user is not closed rashly, the background applications may be better controlled, compared to the method in the related art in which the background application to be closed occupying the biggest memory space may be a background application assigned by the user, such that the user experience may be improved.

Alternatively, in step 11, the step of generating the application list according to the running applications in the operating system includes: determining priorities of running state of the applications running in the operating system; sequencing the identifiers of the running applications according to the priorities of running state from high to low to obtain the application list.

Generally, the priorities of running state may be ordered from high to low as: foreground, visible, perceivable and background. Thus, the priority of running state of the applications running in the operating system may be determined by the terminal device, and then the identifiers of the running applications may be sequenced according to the priorities of running state thereof from high to low to obtain the application list.

One method for generating the application list is presented herein. There are several other methods for generating the application list. For example, the identifiers of the running applications may be sequenced according to the priorities of running state from low to high to obtain the application list. Other methods for generating the application list are not elaborated herein.

Since the applications running in the operating system does not change quickly in a short time, in order to save the resources, the priority of running state of the applications running in the operating system may be determined by the terminal device according to a preset period. The preset period may be set according to practical requirements. For example, the preset period may be set to be 30 seconds, 45 seconds, 60 seconds and so on.

Alternatively, in step 13, the step of determining whether the application corresponding to the currently traversed identifier is a background application includes: obtaining the priority of running state of the application corresponding to the currently traversed identifier; determining that the application corresponding to the currently traversed identifier is a background application if the priority of running state of the application corresponding to the currently traversed identifier is background.

Since the priorities of running state of the applications running in the operating system may be determined by the terminal device, a background application may be determined according to the priority of running state of the application corresponding to the currently traversed identifier. That is, the application whose priority of running state is background may be determined as the background application.

Alternatively, in step 15, a step of selecting an identifier corresponding to a background application from the application list includes: searching for one or more identifiers preceding the currently traversed identifier in the application list and not included in the predetermined white list; selecting one of the one or more identifiers or selecting an identifier closest to the currently traversed identifier from the one or more identifiers, if at least one identifier preceding the currently traversed identifier in the application list and not included in the predetermined white list is found; selecting the currently traversed identifier if no identifier preceding the currently traversed identifier in the application list and not included in the predetermined white list is found.

In order to select an identifier corresponding to a background application from the application list, one or more identifiers preceding the currently traversed identifier in the application list and not included in the predetermined white list may be searched for firstly. That is, a background application not assigned by the user may be found firstly. If at least one identifier is found, one of the one or more identifiers or an identifier closest to the currently traversed identifier may be selected. If no identifier is found, that is, all of background applications corresponding to the one or more identifiers preceding the currently traversed identifier are background applications assigned by the user, the currently traversed identifier may be selected.

Alternatively, the method further includes: obtaining an inactive time period of the application corresponding to the currently traversed identifier if the predetermined white list comprises the currently traversed identifier and the number is not greater than the predetermined threshold; determining whether the inactive time period is longer than a first predetermined time period; closing the application corresponding to the currently traversed identifier if the inactive time period is longer than the first predetermined time period.

In order to avoid wasting the memory resources, in a case that the predetermined white list comprises the currently traversed identifier and the number of identifiers corresponding to background applications in the application list is not greater than the predetermined threshold, the inactive time period of the application corresponding to the currently traversed identifier may be obtained. If the inactive time period is longer than the first predetermined time period, the application corresponding to the currently traversed identifier may be closed directly. That is, even though the predetermined white list comprises the currently traversed identifier and the number of identifiers corresponding to background applications in the application list is not greater than the predetermined threshold, if the application corresponding to the currently traversed identifier is inactive during a long period, the application may be closed. The first predetermined time period may be set according to practical requirements. For example, the first predetermined time period may be set to be 3 minutes, 5 minutes, 10 minutes and so on.

For example, with respect to QQ, it may be in running the background running state if the user does not use it. If the inactive time period of QQ is longer than ten minutes, although the predetermined white list comprises the identifier of QQ, QQ may be closed to save the memory resources.

Alternatively, the method further includes: detecting whether the inactive time period is longer than a second predetermined time period if the inactive time period is not longer than the first predetermined time period; releasing a memory space occupied by a user interface in the application corresponding to the currently traversed identifier if the inactive time period is longer than the second predetermined time period. The second predetermined time period is shorter than the first predetermined time period.

Following the above example, if the inactive time period is not longer than the first predetermined time period, it may be detected whether the inactive time period is longer than the second predetermined time period. The second predetermined time period is shorter than the first predetermined time period. If the inactive time period is longer than the second predetermined time period, the memory space occupied by the user interface of the application corresponding to the currently traversed identifier may be released. If the inactive time period is not longer than the second predetermined time period, a subsequent identifier in the application list may be traversed. The second predetermined time period may be set according to practical requirements. For example, the second predetermined time period may be set to be 3 minutes, 5 minutes, 10 minutes and so on.

For example, with respect to QQ, QQ may be in the background running state if the user does not use it. If the inactive time period of QQ is longer than five minutes, although the predetermined white list comprises the identifier of QQ, the memory space occupied by the user interface in QQ may be released to save the memory resources.

Generally, an application may include two parts: logic codes and a user interface (UI). The UI comprises elements such as pictures and cartoons. In a normal case, the two parts may be stored in the memory. In an Android system, the UI may be activities. The activities are containers used to store the UI of the application. Since a memory space occupied by the logic codes is small, a memory space occupied by the UI of the application whose inactive time period is longer than the second predetermined time period may be released instead of deleting the logic codes of the application, such that a lot of memory resources may be saved. If the running state of the application changes to foreground, since the logic codes of the application are stored, the UI may be reconstructed to not affect the using of the user.

Alternatively, the method further includes: obtaining the inactive time period of the application corresponding to the currently traversed identifier if the predetermined white list does not comprise the currently traversed identifier and the number is not greater than the predetermined threshold; determining whether the inactive time period is longer than a third predetermined time period; releasing the memory space occupied by the user interface in the application corresponding to the currently traversed identifier if the inactive time period is longer than the third predetermined time period.

Accordingly, in order to save the memory resources, in a case that the predetermined white list does not comprise the currently traversed identifier and the number of identifiers corresponding to background applications in the application list is not greater than the predetermined threshold, the inactive time period of the application corresponding to the currently traversed identifier may be obtained. If the inactive time period is longer than the third predetermined time period, the memory space occupied by the user interface in the application corresponding to the currently traversed identifier may be released.

The third predetermined time period may be set according to practical requirements. For example, the third predetermined time period may be set to be 3 minutes, 5 minutes, 10 minutes and so on.

For example, with respect to a calculator application, it may be in a background running state if the user does not use it. If the inactive time period of the calculator is longer than five minutes, since the predetermined white list does not comprise the identifier of the calculator, the memory space occupied by the user interface in the calculator application may be released to save the memory resources.

Alternatively, a step of obtaining the inactive time period of the application corresponding to the currently traversed identifier includes: counting a time period when a process of the application corresponding to the currently traversed identifier does not interact with other processes in the operating system; defining the time period as the inactive time period.

An inactive state of the application refers to a state in which the process of the application does not interact with other processes in the operating system. An interaction may include sending a data request, responding to data requests or communication requests sent by other processes and so on. The time period when the process of the application corresponding to the currently traversed identifier does not interact with other processes in the operating system may be counted to obtain the inactive time period of the application corresponding to the currently traversed identifier.

Figure 2A:
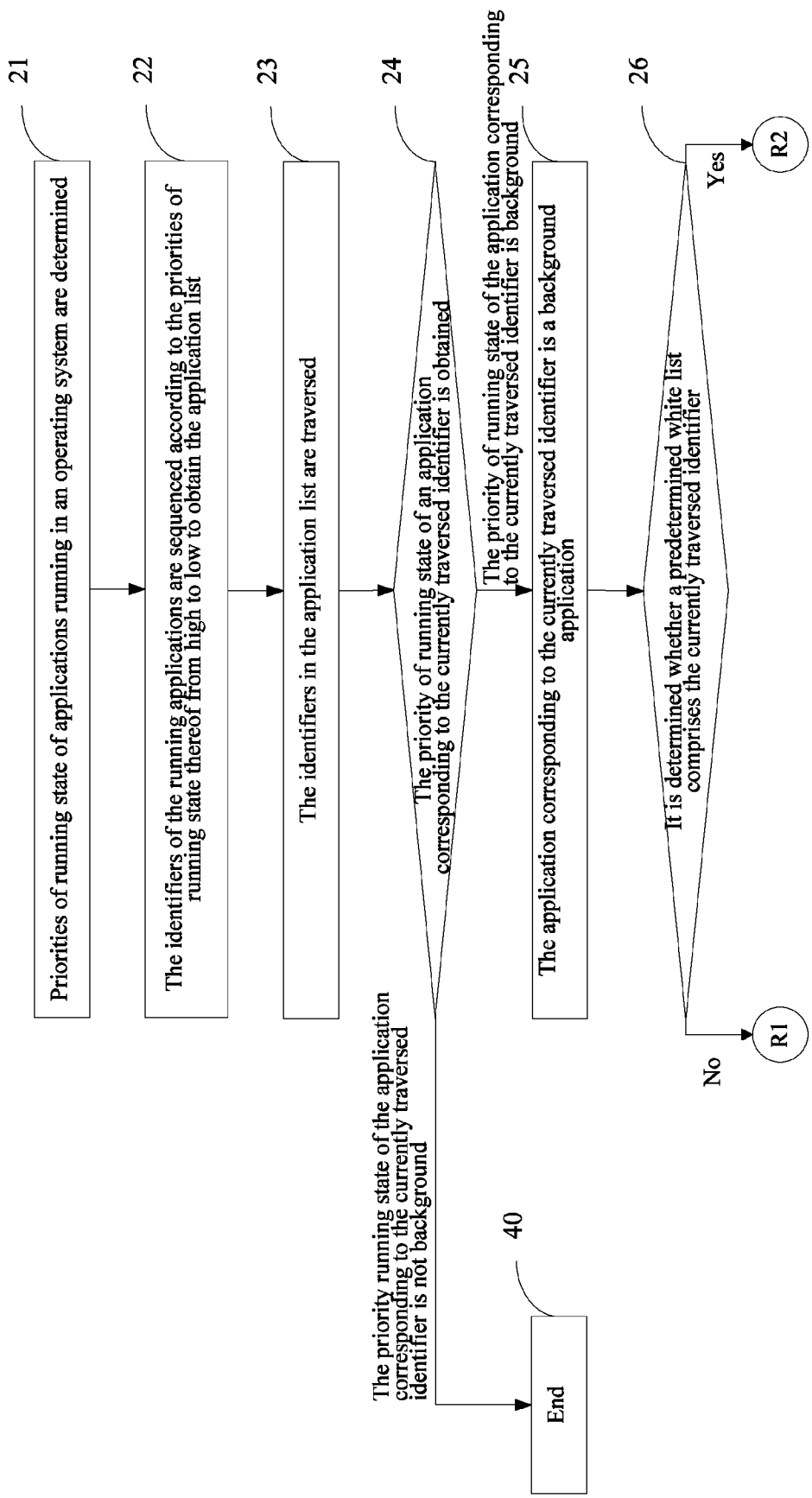
FIG. 2A-2C are flow charts illustrating another method for controlling a background application according to an exemplary embodiment of the present disclosure.
Figure 2B:
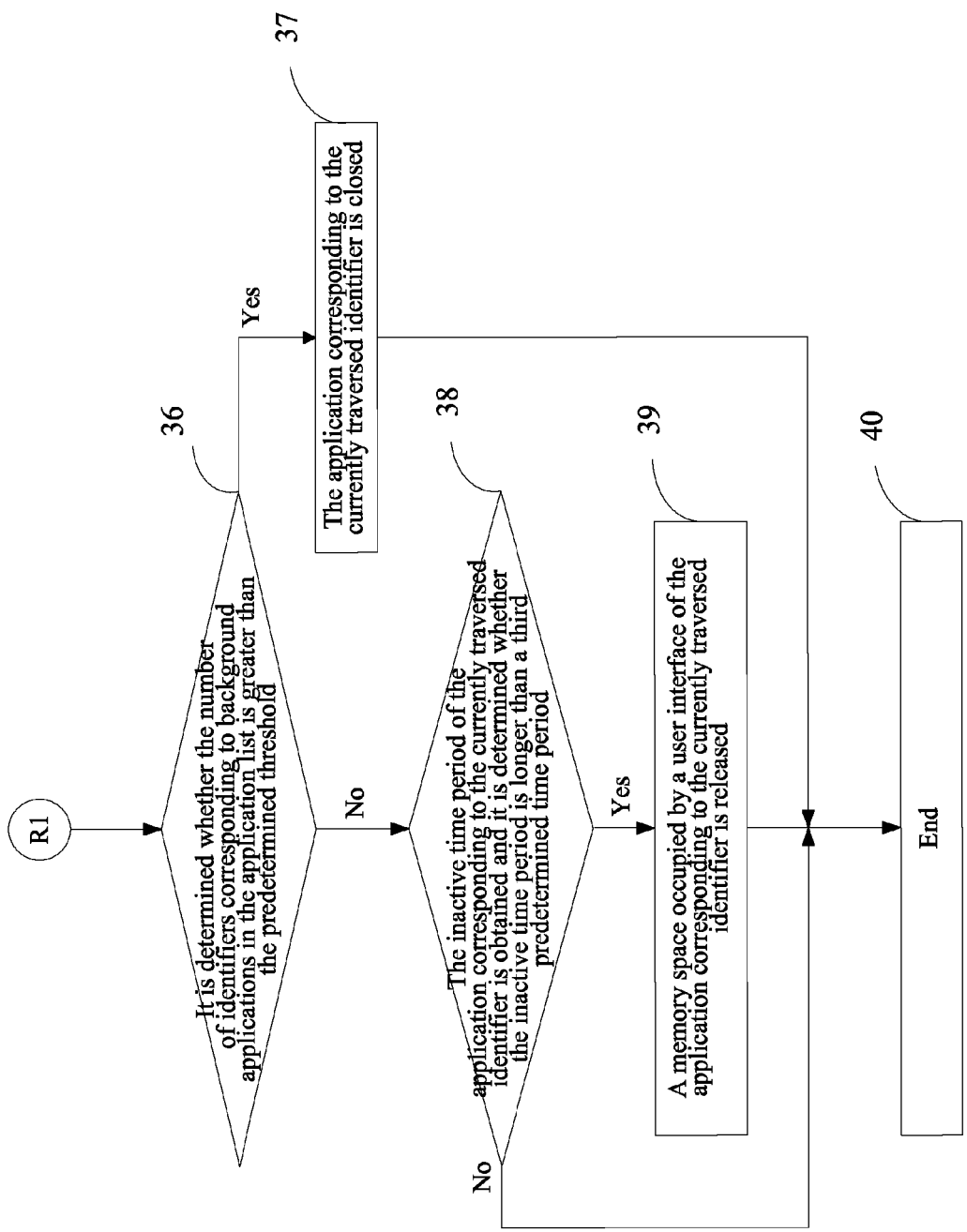
Figure 2C:
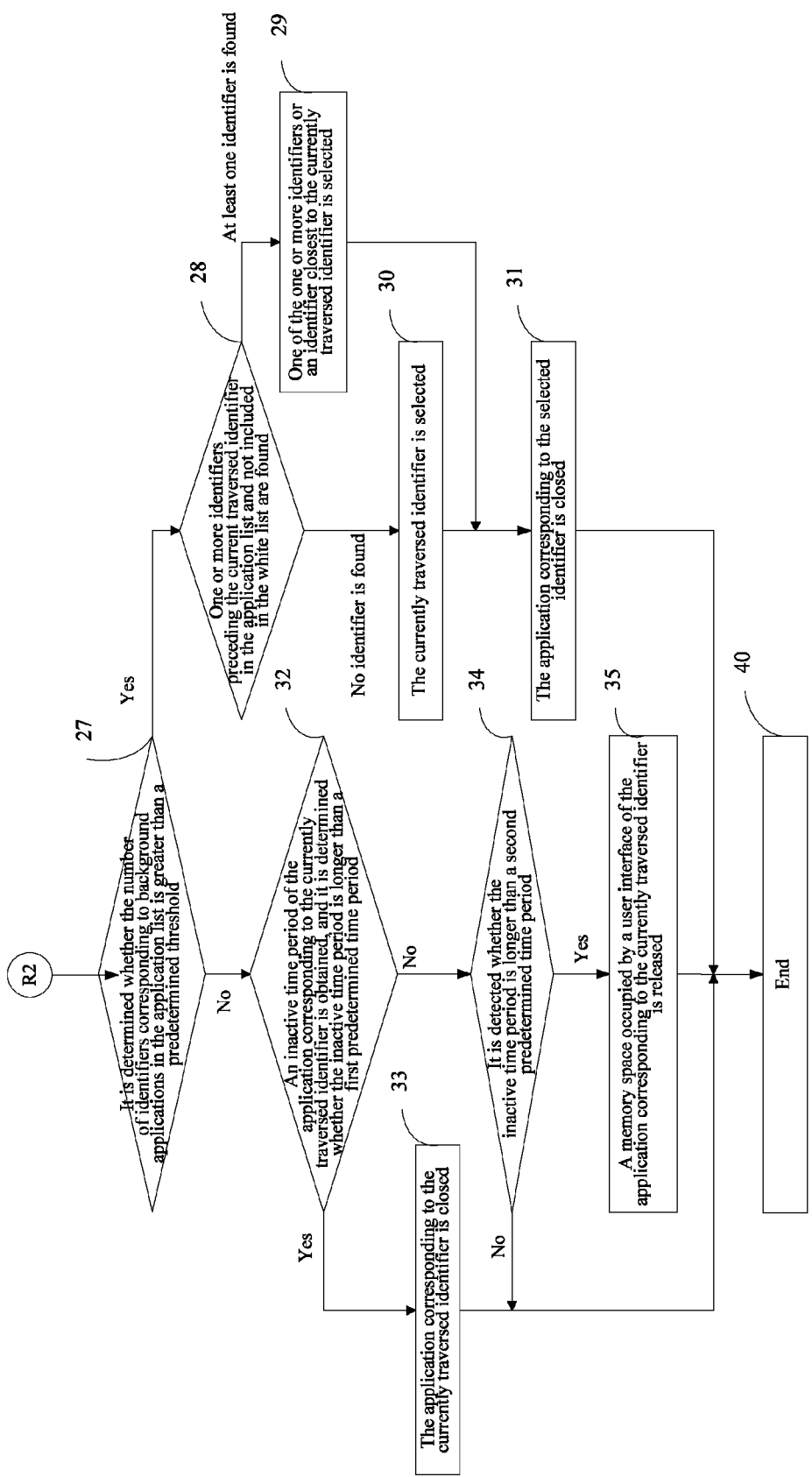

FIG. 2A-2C are flow charts illustrating another method for controlling a background application according to an exemplary embodiment of the present disclosure. As shown in FIG. 2A-2C, the method that is used in a terminal device includes the following steps.

In step 21, priorities of running state of applications running in an operating system are determined.

Generally, the priorities of running state of the running applications may include foreground, visible, perceivable, background, which are ordered from high to low. Methods for determining the priorities of running state of the running applications used in different operating systems may be different. Taking the Android system as an example, the priorities of running state of the running applications may be determined by the Activity Manager Service.

In step 22, the identifiers of the running applications are sequenced according to the priorities of running state thereof from high to low to obtain an application list.

A method for generating the application list is presented herein. There are several other methods for generating the application list. For example, the identifiers of the running applications may be sequenced according to the priorities of running state thereof from low to high to obtain the application list. Other methods for generating the application list are not elaborated herein.

An identifier of an application may be, but is not limited to, a name, an icon of the application and so on.

In step 23, the identifiers in the application list are traversed.

Each time one of the identifiers is traversed, and the procedure for controlling background applications for the traversed identifier is identical. In the following paragraphs, the method is elaborated with reference to an example that an identifier is traversed.

In step 24, a priority of running state of an application corresponding to the currently traversed identifier is obtained.

If the priority of running state of the application corresponding to the currently traversed identifier is background, in step 25, the application corresponding to the currently traversed identifier is a background application, proceed with step 26.

If the priority of running state of the application corresponding to the currently traversed identifier is not background, proceed with step 40.

In step 26, it is determined whether a predetermined white list comprises the currently traversed identifier.

The predetermined white list comprises identifiers of background applications assigned by the user, i.e. the identifiers of background applications that the user does not want to close. For example, a background application assigned by the user may be QQ, WeChat, fetion, Baidu map and so on. The predetermined white list may comprise identifiers of applications such as QQ, WeChat, fetion, Baidu map, etc.

If the predetermined white list comprises the currently traversed identifier, in step 27, it is determined whether the number of identifiers corresponding to background applications in the application list is greater than a predetermined threshold.

The predetermined threshold may be provided according to a hardware configuration of the terminal device and practical requirements. For example, the predetermined threshold may be set to be 10, 20, or 25, etc.

If the number of identifiers corresponding to background applications in the application list is greater than the predetermined threshold, in step 28, one or more identifiers preceding the currently traversed identifier in the application list and not included in the predetermined white list are searched.

If at least one identifier is found, in step 29, one of the one or more identifiers or an identifier closest to the currently traversed identifier is selected, proceed with step 31.

If no identifier is found, in step 30, the currently traversed identifier is selected and the method proceeds with step 31.

In step 31, the application corresponding to the selected identifier is closed, and the method proceeds with step 40.

If the number of identifiers corresponding to background applications in the application list is not greater than the predetermined threshold, in step 32, an inactive time period of the application corresponding to the currently traversed identifier is obtained, and it is determined whether the inactive time period is longer than a first predetermined time period.

If the inactive time period is longer than the first predetermined time period, in step 33, the application corresponding to the currently traversed identifier is closed, and proceed with step 40.

In order to avoid wasting the memory resources, in a case that the predetermined white list comprises the currently traversed identifier and the number of identifiers corresponding to background applications in the application list is not greater than the predetermined threshold, the inactive time period of the application corresponding to the currently traversed identifier may be obtained. If the inactive time period is greater than the first predetermined time period, the application corresponding to the currently traversed identifier may be closed directly. That is, even though the predetermined white list comprises the currently traversed identifier and the number of identifiers corresponding to background applications in the application list is not greater than the predetermined threshold, if the application corresponding to the currently traversed identifier is inactive in a long time period, the application may be closed. The first predetermined time period may be set according to practical requirements. For example, the first predetermined time period may be set to be 3 minutes, 5 minutes, 10 minutes and so on.

For example, with respect to QQ, QQ may be running in a background running state if the user does not use it. If the inactive time period of QQ is longer than ten minutes, although the predetermined white list comprises the identifier of QQ, QQ may be closed to save the memory resources.

If the inactive time period is not longer than the first predetermined time period, in step 34, it is detected whether the inactive time period is longer than a second predetermined time period.

If the inactive time period is longer than the second predetermined time period, in step 35, a memory space occupied by a user interface of the application corresponding to the currently traversed identifier is released, and proceed with step 40.

If the inactive time period is not longer than the second predetermined time period, proceed with step 40.

Still in the above example, if the inactive time period is not longer than the first predetermined time period, it may be detected whether the inactive time period is longer than the second predetermined time period. The second predetermined time period is shorter than the first predetermined time period. If the inactive time period is longer than the second predetermined time period, the memory space occupied by the user interface of the application corresponding to the currently traversed identifier may be released. If the inactive time period is not longer than the second predetermined time period, a subsequent identifier in the application list may be traversed. The second predetermined time period may be set according to practical requirements. For example, the second predetermined time period may be set to be 3 minutes, 5 minutes, 10 minutes and so on.

For example, with respect to QQ, QQ may be running in a background running state if the user does not use it. If the inactive time period of QQ is longer than five minutes, although the predetermined white list comprises the identifier of QQ, the memory space occupied by the user interface in QQ may be released to save the memory resources.

Since the memory space occupied by the UI of the application whose inactive time period is longer than the second predetermined time period is released, a lot of memory resources may be saved. If the running state of the application changes to foreground, the UI may be reconstructed, such that the user is not affected.

If the predetermined white list does not comprise the currently traversed identifier, in step 36, it is determined whether the number of identifiers corresponding to background applications in the application list is greater than the predetermined threshold.

If the number of identifiers corresponding to background applications in the application list is greater than the predetermined threshold, in step 37, the application corresponding to the currently traversed identifier is closed, and the method proceeds with step 40.

If the predetermined white list does not comprise the currently traversed identifier and the number of identifiers corresponding to background applications in the application list is greater than the predetermined threshold, the application corresponding to the currently traversed identifier may be closed directly. Since the predetermined white list does not comprise the currently traversed identifier, that is, the application corresponding to the currently traversed identifier is not the background application assigned by the user, the application corresponding to the currently traversed identifier may be closed directly, such that the memory resources may be saved, thus improving the user experience.

If the number of identifiers corresponding to background applications in the application list is not greater than the predetermined threshold, in step 38, the inactive time period of the application corresponding to the currently traversed identifier is obtained and it is determined whether the inactive time period is longer than a third predetermined time period.

If the inactive time period is longer than the third predetermined time period, in step 39, a memory space occupied by a user interface in the application corresponding to the currently traversed identifier is released, and proceed with step 40.

If the inactive time period is not longer than the third predetermined time period, proceed with step 40.

Accordingly, in order to save the memory resources, in a case that the predetermined white list does not comprise the currently traversed identifier and the number of identifiers corresponding to background applications in the application list is not greater than the predetermined threshold, the inactive time period of the application corresponding to the currently traversed identifier may be obtained. If the inactive time period is longer than the third predetermined time period, the memory space occupied by the user interface in the application corresponding to the currently traversed identifier may be released.

The third predetermined time period may be set according to practical requirements. For example, the third predetermined time period may be set to be 3 minutes, 5 minutes, 10 minutes and so on.

For example, with respect to a calculator application, it may be running in a background running state if the user does not use it. If the inactive time period of the calculator application is longer than five minutes, since the predetermined white list does not comprise the identifier of the calculator application, the memory space occupied by the user interface in the calculator application may be released to save the memory resources.

The method ends at step 40.

Figure 3:
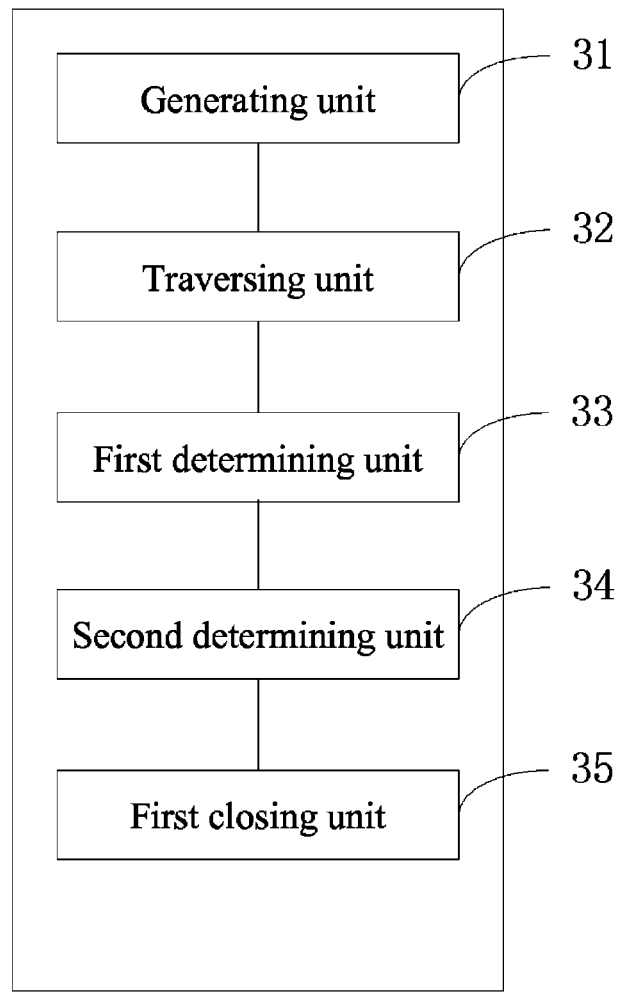
FIG. 3 is a block diagram illustrating an apparatus for controlling a background application according to an exemplary embodiment of the present disclosure.

FIG. 3 is a block diagram illustrating an apparatus for controlling a background application according to an exemplary embodiment of the present disclosure. As shown in FIG. 3, the apparatus includes a generating unit 31, a traversing unit 32, a first determining unit 33, a second determining unit 34 and a first closing unit 35.

The creating unit 31 is configured to generating an application list according to applications running in an operating system. The application list comprises at least identifiers of the applications running in the operating system.

The traversing unit 32 is configured to traverse the identifiers in the application list.

The first determining unit 33 is configured to determine whether an application corresponding to a currently traversed identifier is a background application.

The second determining unit 34 is configured to determine whether a predetermined white list comprises the currently traversed identifier and whether the number of identifiers corresponding to background applications in the application list is greater than a predetermined threshold, if the application corresponding to the currently traversed identifier is a background application. The predetermined white list comprises identifiers of background applications assigned by a user.

The first closing unit 35 is configured to select an identifier corresponding to a background application from the application list and close the background application corresponding to the selected identifier, if the predetermined white list comprises the currently traversed identifier and the number is greater than the predetermined threshold; or close the application corresponding to the currently traversed identifier if the predetermined white list does not comprise the currently traversed identifier and the number is greater than the predetermined threshold.

With the apparatus for controlling a background application according to embodiments of the present disclosure, in order to determine by the terminal device whether a background application should be closed, it is required to take into account whether the number of background applications is greater than the predetermined threshold, as well as whether the predetermined white list comprises the identifier of the background application to be closed. The white list comprises identifiers of background applications assigned by the user. That is, the user does not want to close any of the background applications corresponding to the identifiers in the predetermined white list. For the currently traversed identifier, if the predetermined white list comprises the currently traversed identifier and the number of background applications is greater than the predetermined threshold, a background application is selected and closed. If the predetermined white list does not comprise the currently traversed identifier and the number of background applications is greater than the predetermined threshold, the application corresponding to the currently traversed identifier is closed. Since a background application assigned by the user is not closed rashly, the background applications may be better controlled, compared to the method in the related art in which the background application to be closed occupying a biggest memory space may be a background application assigned by the user, such that the user experience may be improved.

Alternatively, the generating unit 31 includes a state determining subunit and a sequencing subunit.

The state determining subunit is configured to determine priorities of running state of the applications running in the operating system. The priorities of running state rank includes foreground, visible, perceivable and background which are ordered from high to low.

The sequencing subunit is configured to sequence the identifiers of the running applications according to the priorities of running state thereof from high to low to obtain the application list.

Alternatively, the first determining unit 33 includes an obtaining subunit and a first determining subunit.

The obtaining subunit is configured to obtain the priority of running state of the application corresponding to the currently traversed identifier.

The first determining subunit is configured to determine that the application corresponding to the currently traversed identifier is a background application if the priority of running state of the application corresponding to the currently traversed identifier is background.

Alternatively, the first closing unit 35 includes a searching subunit and a selecting subunit.

The searching subunit is configured to search for one or more identifiers preceding the currently traversed identifier in the application list and not included in the predetermined white list.

The selecting subunit is configured to select one of the one or more identifiers or select an identifier closest to the currently traversed identifier from the one or more identifiers, if at least one identifier preceding the currently traversed identifier in the application list and not included in the predetermined white list is found; or select the currently traversed identifier if no identifier preceding the currently traversed identifier in the application list and not included in the predetermined white list is found.

Alternatively, the apparatus further includes a first obtaining unit, a third determining unit, and a second closing unit.

The first obtaining unit is configured to obtain an inactive time period of the application corresponding to the currently traversed identifier if the predetermined white list comprises the currently traversed identifier and the number is not greater than the predetermined threshold.

The third determining unit is configured to determine whether the inactive time period is longer than a first predetermined time period.

The second closing unit is configured to close the application corresponding to the currently traversed identifier if the inactive time period is longer than the first predetermined time period.

Alternatively, the apparatus further includes a detecting unit and a first releasing unit.

The detecting unit is configured to detect whether the inactive time period is longer than a second predetermined time period if the inactive time period is not longer than the first predetermined time period.

The first releasing unit is configured to release a memory space occupied by a user interface of the application corresponding to the currently traversed identifier if the inactive time period is longer than the second predetermined time period. The second predetermined time period is shorter than the first predetermined time period.

Alternatively, the apparatus further includes a second obtaining unit, a fourth determining unit, and a second releasing unit.

The second obtaining unit is configured to obtain an inactive time period of the predetermined application corresponding to the currently traversed identifier if the white list does not comprise the currently traversed identifier and the number is not greater than the predetermined threshold.

The fourth determining unit is configured to determine whether the inactive time period is longer than a third predetermined time period.

The second releasing unit is configured to release a memory space occupied by a user interface of the application corresponding to the currently traversed identifier if the inactive time period is longer than the third predetermined time period.

Alternatively, the first obtaining unit and the second obtaining unit include a counting subunit and a second determining subunit.

The counting subunit is configured to count a time period when a process of the application corresponding to the currently traversed identifier does not interact with other processes in the operating system.

The second determining subunit is configured to define the above time period when a process of the application does not interact with other processes as the inactive time period.

With respect to the apparatuses in the above embodiments, the specific manners for performing operations for individual modules therein have been described in detail in the embodiments regarding the methods for controlling a background application, which are not elaborated herein again.

Figure 4:
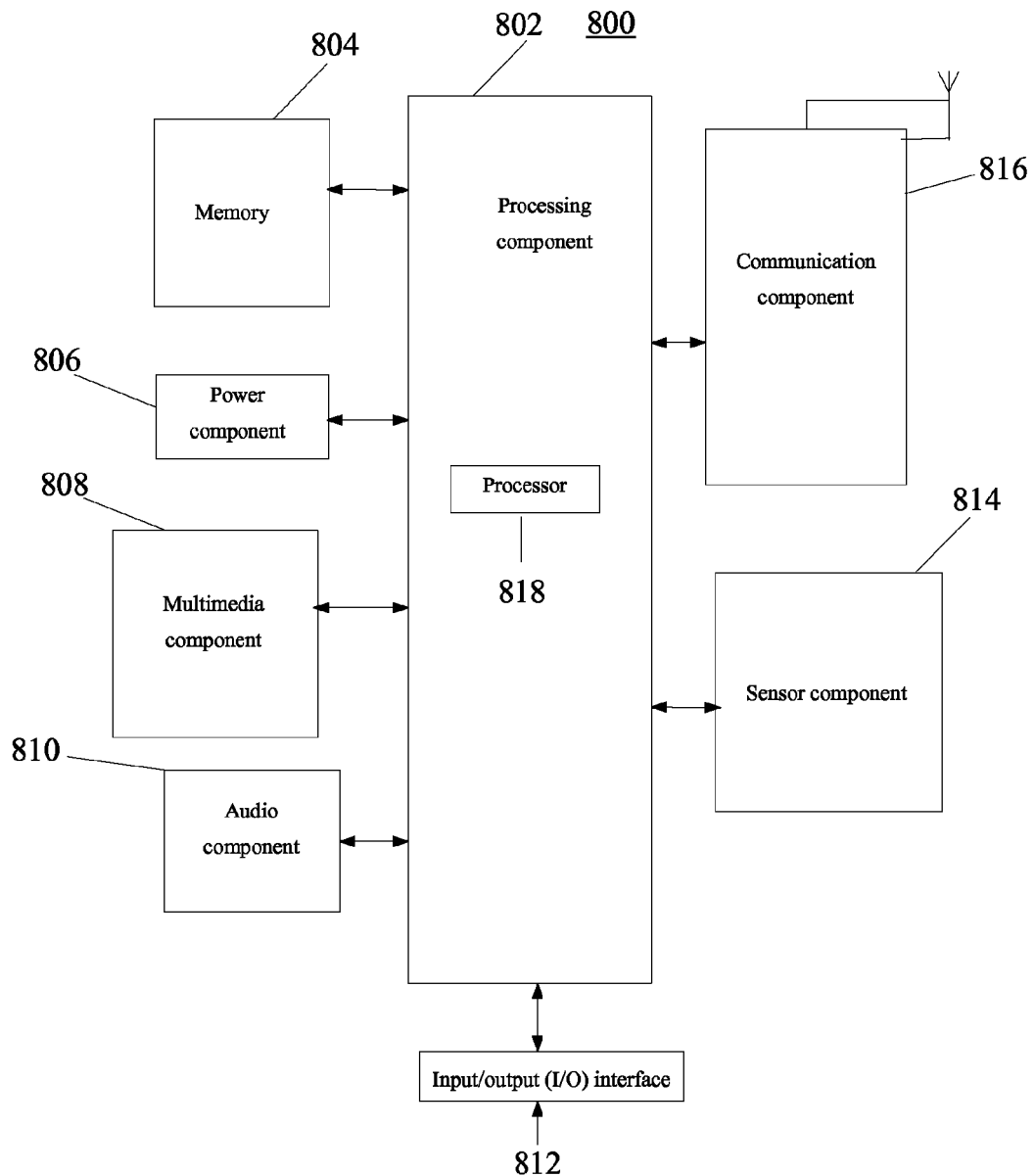
FIG. 4 is a block diagram illustrating a terminal device according to an exemplary embodiment of the present disclosure.

FIG. 4 is a schematic diagram illustrating a terminal device 800 for controlling a background application according to an exemplary embodiment of the present disclosure. For example, the terminal device 800 may be a mobile phone, a computer, a digital broadcasting terminal, a message receiving and sending equipment, a game controller, a tablet device, a medical equipment, a fitness equipment, a PDA and so on.

Referring to FIG. 4, the terminal device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal device 800. Examples of such data include instructions for any applications or methods operated on the terminal device 800, contact data, phonebook data, messages, pictures, videos, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device 800. The power component 806 may include a power management system, one or more power sources, and any other components associated with the generation, control, and distribution of power in the terminal device 800.

The multimedia component 808 includes a screen providing an output interface between the terminal device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 808 includes a front camera and/or a rear camera. The front camera and the rear camera may receive an external multimedia datum while the terminal device 800 is in an operation mode, such as a photographing mode or a video mode. Each of the front camera and the rear camera may be a fixed optical lens system or have focus and optical zoom capability.

The audio component 810 is configured to output and/or input an audio signal. For example, the audio component 810 includes a microphone ("MIC") configured to receive an external audio signal when the terminal device 800 is in an operation mode, such as a call mode, a recording mode, and a voice recognition mode. The received audio signal may be further stored in the memory 804 or transmitted via the communication component 816. In some embodiments, the audio component 810 includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal device 800. For instance, the sensor component 814 may detect an opened/closed status of the terminal device 800, relative positioning of components (e.g., the display and the keypad) of the terminal device 800, a change in position of the terminal device 800 or a component of the terminal device 800, a presence or absence of user contact with the terminal device 800, an orientation or an acceleration/deceleration of the terminal device 800, and a change in temperature of the terminal device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the terminal device 800 and other devices. The terminal device 800 can access a wireless network based on a communication standard, such as WiFi, 2G, or 3G, or a combination thereof. In one exemplary embodiment, the communication component 816 receives a broadcast signal or broadcast associated information from an external broadcast control system via a broadcast channel. In one exemplary embodiment, the communication component 816 further includes a near field communication (NFC) module to facilitate short-range communications. For example, the NFC module may be implemented based on a radio frequency identifier (RFID) technology, an infrared data association (IrDA) technology, an ultra-wideband (UWB) technology, a Bluetooth (BT) technology, and other technologies.

In exemplary embodiments, the terminal device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods according to embodiments of the present disclosure.

In exemplary embodiments, there is also provided a non-transitory computer-readable storage medium including instructions, such as the memory 804 including instructions, and the instructions are executable by the processor 820 of the terminal device 800, for performing the above-described methods. For example, the non-transitory computer-readable storage medium may be a ROM, a RAM (random access memory), a CD-ROM, a magnetic tape, a floppy disc, an optical data storage device, and the like.

A non-transitory computer-readable storage medium is provided, including stored therein instructions that, when executed by a processor of a terminal device, causes the terminal device to execute a method for controlling a background application. The method includes: generating an application list according to applications running in an operating system, wherein the application list at least comprises identifiers of the applications running in the operating system; traversing the identifiers in the application list; determining whether an application corresponding to a currently traversed identifier is a background application; determining whether a predetermined white list comprises the currently traversed identifier and whether a number of identifiers corresponding to background applications in the application list is greater than a predetermined threshold, if the application corresponding to the currently traversed identifier is a background application, wherein the predetermined white list comprises identifiers of background applications assigned by a user; selecting an identifier corresponding to a background application from the application list and closing the background application corresponding to the selected identifier, if the predetermined white list comprises the currently traversed identifier and the number is greater than the predetermined threshold; closing the application corresponding to the currently traversed identifier if the predetermined white list does not comprise the currently traversed identifier and the number is greater than the predetermined threshold.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling a background application, comprising:

generating an application list according to applications running in an operating system, wherein the application list comprises at least identifiers of the applications running in the operating system;

traversing the identifiers in the application list;

determining whether an application corresponding to a currently traversed identifier is a background application;

determining whether a predetermined white list comprises the currently traversed identifier and whether the number of identifiers corresponding to background applications in the application list is greater than a predetermined threshold, if the application corresponding to the currently traversed identifier is a background application, wherein the predetermined white list comprises identifiers of background applications assigned by a user; and selecting an identifier corresponding to a background application from the application list and closing the background application corresponding to the selected identifier, if the predetermined white list comprises the currently traversed identifier and the number is greater than the predetermined threshold; or closing the application corresponding to the currently traversed identifier if the predetermined white list does not comprise the currently traversed identifier and the number is greater than the predetermined threshold;

obtaining an inactive time period of the application corresponding to the currently traversed identifier if the predetermined white list comprises the currently traversed identifier and the number is not greater than the predetermined threshold;

determining whether the inactive time period is longer than a first predetermined time period; and closing the application corresponding to the currently traversed identifier if the inactive time period is longer than the first predetermined time period;

detecting whether the inactive time period is longer than a second predetermined time period if the inactive time period is not longer than the first predetermined time period; and releasing a memory space occupied by a user interface of the application corresponding to the currently traversed identifier if the inactive time period is longer than the second predetermined time period, wherein the second predetermined time period is shorter than the first predetermined time period.

2. The method of claim 1, wherein generating the application list according to the applications running in the operating system comprises:

determining priorities of running state of the applications running in the operating system, wherein the priorities of running state include foreground, visible, perceivable and background which are ordered from high to low; and sequencing the identifiers of the running applications according to the priorities of running state thereof from high to low to obtain the application list.

3. The method of claim 2, wherein determining whether the application corresponding to the currently traversed identifier is a background application comprises:

obtaining a priority of running state of the application corresponding to the currently traversed identifier; and determining that the application corresponding to the currently traversed identifier is a background application if the priority of running state of the application corresponding to the currently traversed identifier is background.

4. The method of claim 2, wherein selecting an identifier corresponding to a background application from the application list comprises:

search for one or more identifiers preceding the currently traversed identifier in the application list and not included in the predetermined white list;

selecting one of the one or more identifiers or selecting an identifier closest to the currently traversed identifier from the one or more identifiers, if at least one identifier preceding the currently traversed identifier in the application list and not included in the predetermined white list is found; and selecting the currently traversed identifier if no identifier preceding the currently traversed identifier in the application list and not included in the predetermined white list is found.

5. The method of claim 1, further comprising:

obtaining an inactive time period of the application corresponding to the currently traversed identifier if the predetermined white list does not comprise the currently traversed identifier and the number is not greater than the predetermined threshold;

determining whether the inactive time period is longer than a third predetermined time period; and releasing a memory space occupied by a user interface of the application corresponding to the currently traversed identifier if the inactive time period is longer than the third predetermined time period.

6. The method of claim 5, wherein obtaining the inactive time period of the application corresponding to the currently traversed identifier comprises:

counting a time period when a process of the application corresponding to the currently traversed identifier does not interact with other processes in the operating system; and defining the time period as the inactive time period.

7. The method of claim 1, wherein obtaining the inactive time period of the application corresponding to the currently traversed identifier comprises:

counting a time period when a process of the application corresponding to the currently traversed identifier does not interact with other processes in the operating system; and defining the time period as the inactive time period.

8. A terminal device for controlling a background application, comprising:

a processor;

a memory configured to store instructions executable by the processor;

wherein the processor is configured to perform:

generating an application list according to applications running in an operating system, wherein the application list comprises at least identifiers of the applications running in the operating system;

traversing the identifiers in the application list;

determining whether an application corresponding to a currently traversed identifier is a background application;

determining whether a predetermined white list comprises the currently traversed identifier and whether the number of identifiers corresponding to background applications in the application list is greater than a predetermined threshold, if the application corresponding to the currently traversed identifier is a background application, wherein the predetermined white list comprises identifiers of background applications assigned by a user; and selecting an identifier corresponding to a background application from the application list and closing the background application corresponding to the selected identifier, if the predetermined white list comprises the currently traversed identifier and the number is greater than the predetermined threshold; or closing the application corresponding to the currently traversed identifier if the predetermined white list does not comprise the currently traversed identifier and the number is greater than the predetermined threshold;

obtaining an inactive time period of the application corresponding to the currently traversed identifier if the predetermined white list comprises the currently traversed identifier and the number is not greater than the predetermined threshold;

determining whether the inactive time period is longer than a first predetermined time period; and closing the application corresponding to the currently traversed identifier if the inactive time period is longer than the first predetermined time period;

detecting whether the inactive time period is longer than a second predetermined time period if the inactive time period is not longer than the first predetermined time period; and releasing a memory space occupied by a user interface of the application corresponding to the currently traversed identifier if the inactive time period is longer than the second predetermined time period, wherein the second predetermined time period is shorter than the first predetermined time period.

9. The terminal device of claim 8, wherein generating the application list according to the applications running in the operating system comprises:

determining priorities of running state of the applications running in the operating system, wherein the priorities of running state include foreground, visible, perceivable and background which are ordered from high to low; and sequencing the identifiers of the running applications according to the priorities of running state thereof from high to low to obtain the application list.

10. The terminal device of claim 9, wherein determining whether the application corresponding to the currently traversed identifier is a background application comprises:

obtaining a priority of running state of the application corresponding to the currently traversed identifier; and determining that the application corresponding to the currently traversed identifier is a background application if the priority of running state of the application corresponding to the currently traversed identifier is background.

11. The terminal device of claim 9, wherein selecting an identifier corresponding to a background application from the application list comprises:

searching for one or more identifiers preceding the currently traversed identifier in the application list and not included in the predetermined white list;

selecting one of the one or more identifiers or select an identifier closest to the currently traversed identifier from the one or more identifiers, if at least one identifier preceding the currently traversed identifier in the application list and not included in the predetermined white list is found; and selecting the currently traversed identifier if no identifier preceding the currently traversed identifier in the application list and not included in the predetermined white list is found.

12. The terminal device of claim 8, wherein the processor is further configured to perform:

obtaining an inactive time period of the application corresponding to the currently traversed identifier if the predetermined white list does not comprise the currently traversed identifier and the number is not greater than the predetermined threshold;

determining whether the inactive time period is longer than a third predetermined time period; and releasing a memory space occupied by a user interface of the application corresponding to the currently traversed identifier if the inactive time period is longer than the third predetermined time period.

13. The terminal device of claim 12, wherein obtaining the inactive time period of the application corresponding to the currently traversed identifier comprises:

counting a time period when a process of the application corresponding to the currently traversed identifier does not interact with other processes in the operating system; and defining the time period as the inactive time period.

14. The terminal device of claim 8, wherein obtaining the inactive time period of the application corresponding to the currently traversed identifier comprises:

counting a time period when a process of the application corresponding to the currently traversed identifier does not interact with other processes in the operating system; and defining the time period as the inactive time period.

15. A non-transitory computer-readable storage medium having stored therein instructions that, when executed by a processor of a terminal device, causes the terminal device to perform a method for controlling a background application, the method comprising:

generating an application list according to applications running in an operating system, wherein the application list comprises at least identifiers of the applications running in the operating system;

traversing the identifiers in the application list;

determining whether an application corresponding to a currently traversed identifier is a background application;

determining whether a predetermined white list comprises the currently traversed identifier and whether the number of identifiers corresponding to background applications in the application list is greater than a predetermined threshold, if the application corresponding to the currently traversed identifier is a background application, wherein the predetermined white list comprises identifiers of background applications assigned by a user; and selecting an identifier corresponding to a background application from the application list and closing the background application corresponding to the selected identifier, if the predetermined white list comprises the currently traversed identifier and the number is greater than the predetermined threshold; or closing the application corresponding to the currently traversed identifier if the predetermined white list does not comprise the currently traversed identifier and the number is greater than the predetermined threshold;

obtaining an inactive time period of the application corresponding to the currently traversed identifier if the predetermined white list comprises the currently traversed identifier and the number is not greater than the predetermined threshold;

determining whether the inactive time period is longer than a first predetermined time period; and closing the application corresponding to the currently traversed identifier if the inactive time period is longer than the first predetermined time period;

detecting whether the inactive time period is longer than a second predetermined time period if the inactive time period is not longer than the first predetermined time period; and releasing a memory space occupied by a user interface of the application corresponding to the currently traversed identifier if the inactive time period is longer than the second predetermined time period, wherein the second predetermined time period is shorter than the first predetermined time period.

* * * * *